(12) United States Patent
Buelow et al.

(10) Patent No.: US 8,977,018 B2
(45) Date of Patent: Mar. 10, 2015

(54) MULTI-MODALITY BREAST IMAGING

(75) Inventors: Thomas Buelow, Grosshansdorf (DE); Michael Grass, Buchholz In der Nordheide (DE); Klaus Erhard, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 215 days.

(21) Appl. No.: 13/384,265

(22) PCT Filed: Jul. 12, 2010

(86) PCT No.: PCT/IB2010/053178
§ 371 (c)(1),
(2), (4) Date: Jan. 16, 2012

(87) PCT Pub. No.: WO2011/007312
PCT Pub. Date: Jan. 20, 2011

(65) Prior Publication Data
US 2012/0114213 A1  May 10, 2012

(30) Foreign Application Priority Data
Jul. 17, 2009  (EP) .................................... 09165801

(51) Int. Cl.
*G06K 9/00* (2006.01)
*G06T 7/00* (2006.01)

(52) U.S. Cl.
CPC ..... *G06T 7/0032* (2013.01); *G06T 2207/10088* (2013.01); *G06T 2207/10116* (2013.01); *G06T 2207/30068* (2013.01)
USPC .......................................... 382/128; 600/407

(58) Field of Classification Search
CPC .................. G06T 2207/30068; G06T 7/0012; G06T 7/0024; G06T 2207/10116; G06T 2207/10132; G06T 7/0028; G06T 7/0032; G06T 11/005; G06T 17/00; G06T 2207/10081; G06T 2207/10088; G06T 3/0093; G06T 7/0083; G06T 2207/10072; G06T 2207/10112; G06T 7/004; G06T 7/0079; G06K 9/6209; G06K 9/6206; G06K 9/32; G06K 9/621; A61B 6/502; A61B 5/4312; A61B 2019/205; A61B 5/055; A61B 5/0091; A61B 8/0825; A61B 2019/5236; A61B 2019/5408; A61B 6/03; A61B 6/032
See application file for complete search history.

(56) References Cited

U.S. PATENT DOCUMENTS
5,452,367 A * 9/1995 Bick et al. ..................... 382/128
5,941,862 A * 8/1999 Haynes et al. ................ 604/368
(Continued)

FOREIGN PATENT DOCUMENTS
EP        1780672 A1    5/2007
JP        2008086400 A  4/2008

OTHER PUBLICATIONS
Jae-Hoon Chung, "Modelling Mammographic Compression of the Breast", Medical Image Computing and Computer-Assisted Intervention, 2008, pp. 758-765.
(Continued)

*Primary Examiner* — Manav Seth

(57) ABSTRACT

A system for multi-modality breast imaging comprises a first shape model constructing sub-system (1) for constructing a first shape model of the breast as represented in a first image (9), in which the breast has its natural shape, a second shape model constructing sub-system (2) for constructing a second shape model of the breast as represented in a second image (10), in which the breast is compressed by using a compression paddle, and a deformation estimating sub-system (3) for estimating a volumetric deformation field (12) defining a mapping between the first image (9) and the second image (10) on the basis of the shape models and an elastic deformation model (11) of the breast, the deformation estimating sub-system (3) being arranged to estimate the volumetric deformation field (12) on the basis of a first tissue surface of the breast in the first image (9) and a second tissue surface of the breast in the second image (10).

20 Claims, 3 Drawing Sheets

(56) References Cited

U.S. PATENT DOCUMENTS

| | | | |
|---|---|---|---|
| 6,075,879 A * | 6/2000 | Roehrig et al. | 382/132 |
| 6,091,981 A * | 7/2000 | Cundari et al. | 600/407 |
| 7,298,881 B2 * | 11/2007 | Giger et al. | 382/128 |
| 7,672,495 B2 * | 3/2010 | Evertsz et al. | 382/128 |
| 2003/0194050 A1 * | 10/2003 | Eberhard et al. | 378/37 |
| 2007/0237373 A1 * | 10/2007 | Kiraly et al. | 382/128 |
| 2008/0130968 A1 * | 6/2008 | Daw et al. | 382/128 |
| 2008/0152086 A1 | 6/2008 | Hall et al. | |
| 2008/0159604 A1 * | 7/2008 | Wang et al. | 382/128 |
| 2008/0219567 A1 * | 9/2008 | Claus et al. | 382/232 |
| 2008/0292164 A1 | 11/2008 | Azar et al. | |
| 2009/0129650 A1 | 5/2009 | Hawkes et al. | |
| 2012/0134568 A1 * | 5/2012 | Russakoff | 382/132 |

OTHER PUBLICATIONS

Pras Pathmanathan et al, "Predicting Tumor Location by Modeling the Deformation of the Breast", IEEE Transactions on Biomedical Engineering, vol. 55, No. 10, pp. 2471-2480.

Christsine Tanner et al, "Using Statistical Deformation Models for the Registration of Multimodal Breast Images", Proceedings of the International Society for Optical Engineering, vol. 7259, Jan. 1, 2009, pp. 72590P-1-72590P-9.

* cited by examiner

US 8,977,018 B2

MULTI-MODALITY BREAST IMAGING

FIELD OF THE INVENTION

The invention relates to multi-modality breast imaging.

BACKGROUND OF THE INVENTION

Different imaging modalities may be used in the process of diagnosing suspected breast cancer patients. For example, breast magnetic resonance (MR) imaging is well established in diagnostic imaging. At the same time, digital breast tomosynthesis (DBT) is gaining increased attention. While both modalities generate 3D images of the breast, the information that is contained in the data is at least partly complementary. For example, calcifications are mainly visible in DBT, whereas dynamic contrast-enhanced MR is able to highlight mass-like lesions by detecting increased signal intensity caused by tumor vascularization.

US 2003/0194050 A1 discloses a multi-modality imaging system which combines an X-ray tomosynthesis sub-system and a nuclear medicine imaging sub-system. Both sub-systems are operated while the breasts are compressed by a means for compressing a patient's breast. In this way, the images obtained from X-ray tomosynthesis and nuclear medicine mammography can be combined.

The paper by J. Chung et al., entitled "Modelling Mammographic Compression of the Breast", MICCAI 2008, Part II, LNCS 5242, pp. 758-565, 2008, Springer-Verlag Berlin, hereinafter referred to as Chung, discloses a biomechanical model of the breast so as to simulate compression during mammographic imaging. The model provides a multi-modality imaging registration tool to help identify potential tumors observed between mammograms and MRI or ultrasound. The model requires positions of the compression paddles before and after compression to simulate the deformation by using contact mechanics.

SUMMARY OF THE INVENTION

It would be advantageous to have an improved way of multi-modality breast imaging. To better address this concern, a first aspect of the invention provides a system comprising:

a first shape model constructing sub-system for constructing a first shape model of the breast as represented in a first image, in which the breast has its natural shape;

a second shape model constructing sub-system for constructing a second shape model of the breast as represented in a second image, in which the breast is compressed by using a compression paddle; and a deformation estimating sub-system for estimating a volumetric deformation field defining a mapping between the first image and the second image on the basis of the shape models and an elastic deformation model of the breast.

The shape models and the elastic deformation model allow the provision of a volumetric deformation field, even when breast compression is applied for acquiring the second image, but not for acquiring the first image. The shape models and elastic deformation model also allow the provision of the volumetric deformation field when different compression is applied for acquiring the first image and the second image. The system does not need the exact compression paddle positions to simulate a deformation. Rather, the shape model of the breast as represented in the second image may be used. Moreover, the shape model may provide additional information about the surface of the skin, for example, about the skin portion which is not in contact with the compression plates. This enhances the volumetric deformation field.

The deformation estimating sub-system may be arranged to estimate the volumetric deformation field on the basis of a first tissue surface of the breast in the first image and a second tissue surface of the breast in the second image. The tissue surface provides particular detailed information, making the volumetric deformation field more reliable. The tissue surface may be the skin surface.

The deformation estimating sub-system may be arranged to estimate the volumetric deformation field also on the basis of an estimation of tissue volume of the breast as represented in the first image compared to the second image. This may further increase the reliability of the volumetric deformation field. The elastic deformation model may take into account the difference in tissue volume.

The deformation estimating sub-system may further comprise a landmark identifying sub-system for identifying a landmark in the first image and in the second image. Identification of the landmark in both images improves the reliability of the volumetric deformation field. The landmarks can be used as a constraint in the elastic deformation model.

The landmark identifying sub-system may be arranged to identify a nipple as the landmark. Such a nipple is relatively easy to detect and improves the reliability or accuracy.

The landmark identifying sub-system may be arranged to identify a lymph node as the landmark. Such a landmark is relatively easy to detect and improves the reliability or accuracy.

The landmark identifying sub-system may be arranged to identify at least part of a milk duct as the landmark. Such a landmark is relatively easy to detect and improves the reliability or accuracy.

The deformation estimating sub-system may be arranged to estimate the volumetric deformation field also on the basis of compression information which is indicative of a state of compression plates during acquisition of the second image. Using this information improves the reliability. It may also improve the accuracy.

The system may comprise an image marker for marking an anatomical point or region of interest at corresponding positions in both the first image and the second image, based on the volumetric deformation field. This is a useful application of the volumetric deformation field. The marking may be shown to a user, for example, by showing either or both of the images with the mark indicating the anatomical point or region of interest.

The second image may comprise a breast tomosynthesis image. The system may further comprise a calcification detector for detecting a calcification in the breast tomosynthesis image, the image marker being arranged to mark an anatomical position in the first image corresponding to the calcification, based on the volumetric deformation field. In this way, the identification of the location of the calcification in the first image is facilitated. The location can be shown to a user.

The first image may comprise a breast MR image. The system may further comprise a contrast uptake detector for detecting a location of contrast uptake due to vascularization in the breast MR image, the image marker being arranged to mark an anatomical position in the second image corresponding to the location detected in the breast MR image, based on the volumetric deformation field. In this way, the location of the vascularization is identified in the second image. The location can be shown to a user.

A breast image acquisition apparatus may comprise a breast MR scanner for acquiring the first image and/or an x-ray breast tomosynthesis scanner for acquiring the second image. The breast image acquisition apparatus may further comprise the system for multi-modality breast imaging set forth herein.

A medical workstation may comprise the above-mentioned system for multi-modality breast imaging. Such a medical workstation may further comprise a display for displaying breast information based on the volumetric deformation field.

A method of multi-modality breast imaging comprises the steps of:

constructing a first shape model of the breast as represented in a first image, in which the breast has its natural shape;

constructing a second shape model of the breast as represented in a second image, in which the breast is compressed by using a compression paddle; and estimating a volumetric deformation field defining a mapping between the first image and the second image on the basis of the shape models and an elastic deformation model of the breast.

A computer program product may comprise instructions for causing a processor system to perform the above-mentioned method.

It will be appreciated by those skilled in the art that two or more of the above-mentioned embodiments, implementations, and/or aspects of the invention may be combined in any way deemed useful.

Modifications and variations of the image acquisition apparatus, the workstation, the system, and/or the computer program product, which correspond to the described modifications and variations of the system, can be carried out by a person skilled in the art on the basis of the present description.

A person skilled in the art will appreciate that the method may be applied to multi-dimensional image data, e.g. to two-dimensional (2-D), three-dimensional (3-D) or four-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

In this description, the breast is represented in a first image and in a second image. In the first image, the breast has a first deformation state. For example, the first deformation state is a natural shape of the breast. In such a case, the first image may be referred to as a first image. However, it should be noted that the natural state of the breast can vary depending on, for example, the orientation of the patient (e.g. prone or supine). The first deformation state may also be a state in which the breast is slightly compressed, for example because it is inside an MR coil cylinder. In the second image, the breast has a second deformation state. In the second deformation state, the breast may be compressed. In this case, the second image may be referred to as a second image. The compression may be performed by means of one or two compression paddles, as known in the art. The compression may substantially alter the shape of the breast compared to the first deformation state. For example, the breast may be compressed more in the second image than in the first image. The compression relates to physical compression of the patient's breast while the image is acquired.

In the diagnostic workup of suspected breast cancer, breast MRI is a well-established imaging modality, while at the same time Digital Breast Tomosynthesis (DBT) is gaining increased attention. Due to the differences in patient positioning in the two imaging modalities—Breast MR images are acquired in a prone position with only slight compression applied, while DBT scans are done by using significant compression of the breast tissue, as in Mammography—it is difficult to visually merge the information gained from DBT and MR. This description discloses techniques for generating fused views of, inter alia, DBT and MR images depicting the features provided by each modality in corresponding anatomic positions. However, the use of DBT or MR images is not a limitation. The techniques can be used to fuse or otherwise combine three-dimensional breast images, wherein one of the images uses only slight compression or no compression at all, whereas the other image is acquired by using significant compression of the breast tissue.

Figure 1:
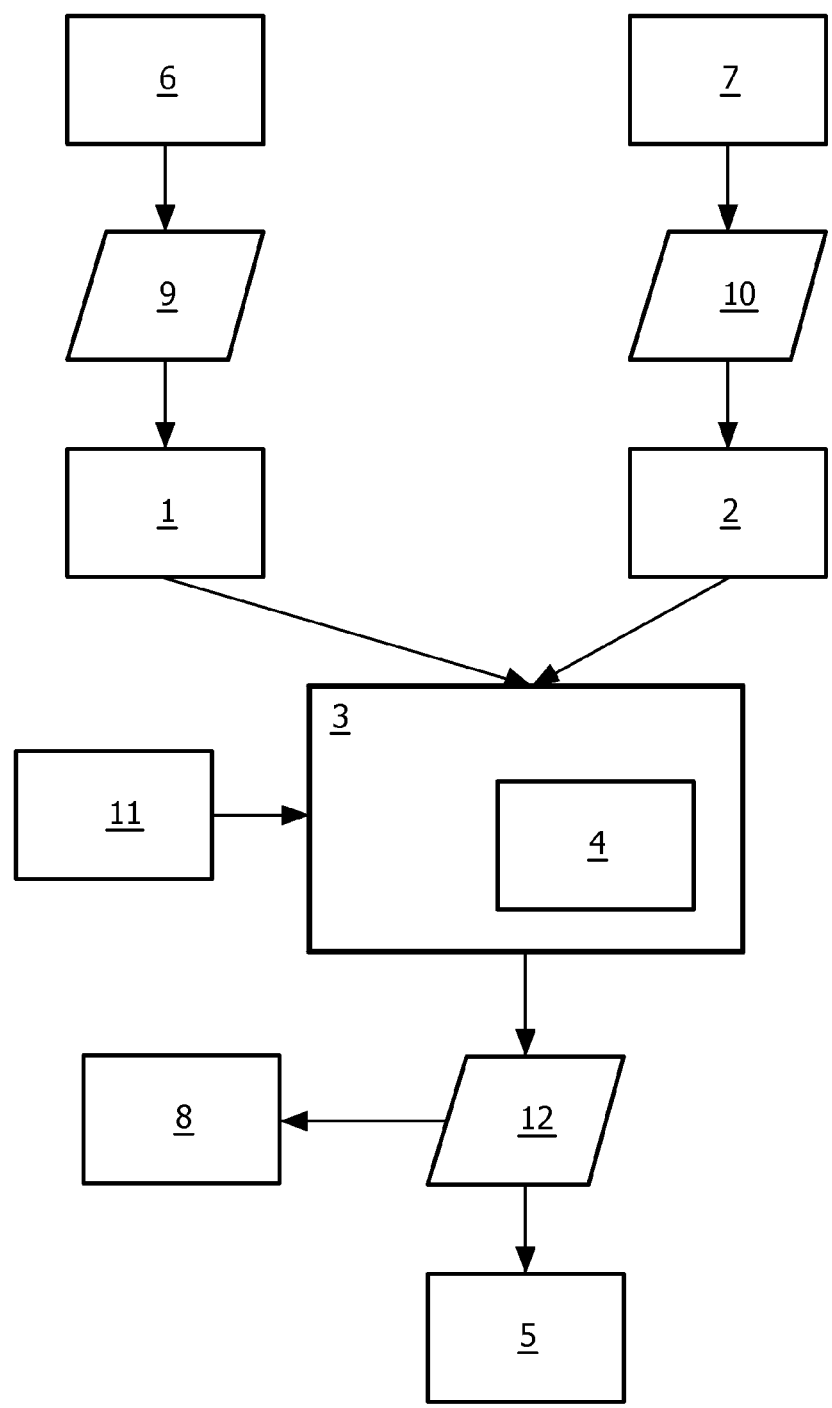
FIG. 1 is a diagram of a system for multi-modality breast imaging.

FIG. 1 illustrates a system for multi-modality breast imaging. The system may comprise a memory (not shown) for storing the data received and/or generated by the system. The system may further comprise a processor (not shown) for executing instructions. The memory may further be arranged to store software codes comprising the instructions implementing some or all of the sub-systems of the system. Moreover, the system may comprise a communication port for receiving and transmitting data. For example, the communication port comprises a network connection, allowing access to an image repository such as a PACS system. The communication port may also provide direct communication with an image scanner. The system may further comprise a display and/or a user input device such as a keyboard and/or mouse, for acting as a user interface enabling a user to view results generated by the system and/or control the operation of the system.

The memory may be arranged to store a first image 9. The first image 9 may comprise an image of a substantially natural shape of the breast. Such an image may be acquired with the patient in, for example, a prone position or in an upright position. The breast is not compressed or only slightly compressed. The memory may further be arranged to store a second image 10. The second image may be acquired with the patient's breast in a compressed condition. For example, the breast is put in between two compression plates, and the compression plates are pressed together, thereby flattening the breast. The second image may be a volumetric image reconstructed by means of a reconstruction technique known in the art.

Figure 3:
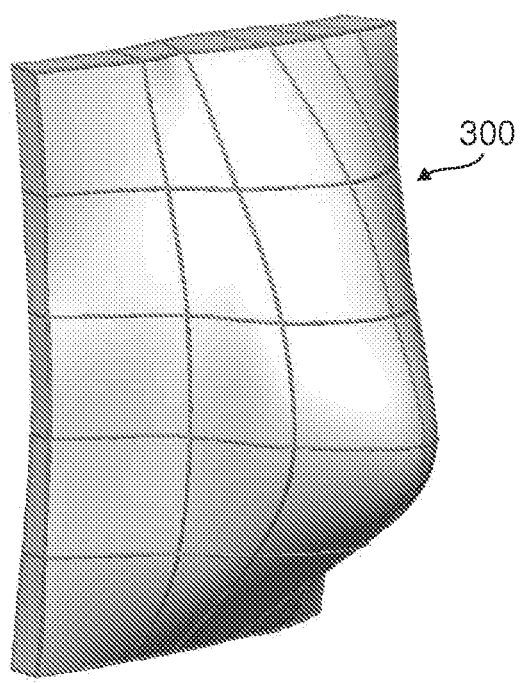
FIG. 3 is a perspective view of a geometric breast model.

The system may comprise a first shape model constructing sub-system 1 for constructing a first shape model of the breast as represented in the first image 9. Such a shape model may be constructed by adapting the shape of a geometric breast model 300, as illustrated by way of example in FIG. 3, to the actual shape based on the image features in the first image 9. Such adaptive shape modeling techniques are known in the art. Alternatively, another segmentation technique may be used to construct the first shape model.

The system may comprise a second shape model constructing sub-system 2 for constructing a second shape model of the breast as represented in the second image 10, on the basis of image features detected in the second image 10. A similar technique may be used for constructing the first and the second shape model. Again, the geometric breast model 300 may be used as the starting position of adaptive shape modeling. Alternatively, a geometric breast model of a compressed breast may be used.

The system may comprise a deformation estimating subsystem 3 for estimating a volumetric deformation field 12 defining a mapping between the first image 9 and the second image 10 on the basis of the shape models. The system may estimate the volumetric deformation field 12 by using an elastic deformation model 11 of the breast. The elastic deformation model 11 may comprise information such as the elasticity of the breast tissue. Information about the elasticity of the breast, together with the changed shape of the breast as represented by the shape models, may be used to estimate the volumetric deformation field 12. The elastic deformation model 11 may also comprise a model of elastic deformations which may be the result of compression paddles; involved parameters may include position and/or compression strength of the paddles. These parameters may be varied iteratively, while re-computing the corresponding breast shape, until the resulting computed breast shape best matches the second shape model. A model of elastic deformations resulting from compression paddles is known.

The deformation estimating sub-system 3 may be arranged to estimate the volumetric deformation field 12 on the basis of a first tissue surface of the breast in the first image 9 and a second tissue surface of the breast in the second image 10. The breast tissue surface, for example, the skin, provides appropriate boundary information which may be used by the deformation estimating sub-system 3 in combination with the elastic deformation model 11.

The deformation estimating sub-system 3 may be arranged to estimate the volumetric deformation field 12 also on the basis of an estimation of tissue volume of the breast. The natural tissue volume of the breast may be extracted from feature information represented in the first image 9. The tissue volume of the compressed breast may be extracted from the second image 10. The comparison of these tissue volumes may be used in combination with the elastic deformation model 11 so as to obtain the volumetric deformation field 12.

The deformation estimating sub-system 3 may comprise a landmark identifying sub-system 4 for identifying a landmark in the first image 9 and in the second image 10. Information which can be used to construct the volumetric deformation field is obtained by identifying the same anatomical landmark or two different landmarks having a known geometrical relationship in the two images. The landmark identifying sub-system 4 may be arranged to identify a nipple as the landmark. The nipple position may be identified by analyzing the skin surface. The landmark identifying sub-system 4 may be arranged to identify a lymph node as the landmark. The landmark identifying sub-system 4 may also be arranged to identify at least part of a milk duct as the landmark. Such a lymph node or milk duct may be identified in an image automatically or manually.

The deformation estimating sub-system 3 may be arranged to estimate the volumetric deformation field 12 also on the basis of compression information which is indicative of a state of compression paddles during acquisition of the second image. The amount of compression can be used in combination with the elastic deformation model 11 so as to establish the volumetric deformation field 12.

The system may comprise an image marker 5 for marking an anatomical point or region of interest at corresponding positions in both the first image 9 and the second image 10, based on the volumetric deformation field 12. For example, a user may indicate a particular point of interest in one of the images via a user interface. The image marker 5 computes the corresponding point in the other image by applying the volumetric deformation field 12. This corresponding point may be indicated, e.g. highlighted, in a visualization of the image shown on a display 8 or stored in the memory or on an image repository or patient file.

The system may further comprise a lesion detector for detecting a lesion in the first image or second image, and the image marker may be arranged to mark a corresponding anatomical position in the other image. For example, the lesion is detected in the second image. An example lesion is a calcification. Such a calcification may be detected, for example, if the second image comprises a breast tomosynthesis image. The image marker 5 may be arranged to mark an anatomical position in the first image 9 corresponding to the lesion, based on the volumetric deformation field 12.

The system may further comprise a contrast uptake detector for detecting a location of contrast uptake due to vascularization in the first image, for example, a breast MR image. The image marker 5 may be arranged to mark an anatomical position in the second image 10 corresponding to the location detected in the breast MR image, based on the volumetric deformation field 12.

The system set forth herein may be incorporated in a breast image acquisition apparatus, for example, a natural-breast scanner 6 for acquiring the first image 9, or a compressed-breast scanner 7 for acquiring the second image 10.

The system set forth may also be incorporated in a medical workstation. Such a workstation may comprise a display 8 for displaying breast information based on the volumetric deformation field 12. The workstation may further comprise a user input device such as a keyboard and/or pointing device such as a mouse.

Figure 2:
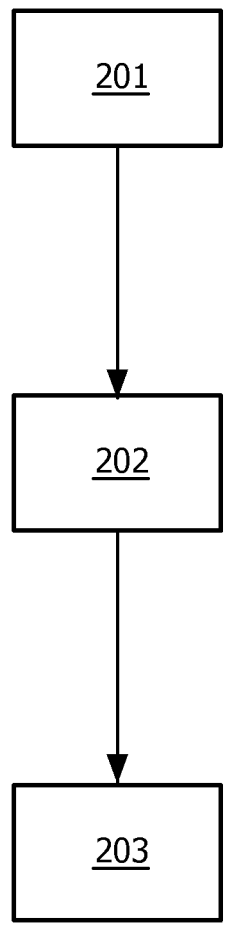
FIG. 2 is a flow chart of a method of multi-modality breast imaging.

FIG. 2 illustrates a method of multi-modality breast imaging. Step 201 of the method comprises constructing a first shape model of the breast as represented in a first image, in which the breast may have its natural shape. Step 202 comprises constructing a second shape model of the breast as represented in a second image, in which the breast may be compressed, e.g. by using a compression paddle. Step 203 comprises estimating a volumetric deformation field defining a mapping between the first image and the second image on the basis of the shape models and an elastic deformation model of the breast. The order of the steps is given by way of example. For example, the order of steps 201 and 202 may be exchanged. Steps 201 and 202 may also be performed in parallel.

In the following, emphasis is put on the example of a tomosynthesis image and an MR image. However, the same techniques may be applied to first and second image originating from different imaging modalities. Input to the methods and systems disclosed herein may be a 3D MR dataset and a 3D DBT dataset. The MR data may contain multiple imaging series such as a dynamic T1 weighted series, a T2 weighted series, a DWI series, etc. In addition to a standard reconstruction, feature-enhanced reconstructions (e.g. emphasizing calcifications) may be available for DBT. The breasts may be segmented in the MR images and a finite element (FE) mesh model of the breasts may be constructed. The outline of the compressed breasts may be reconstructed by segmentation of the tomosynthesis image or by fitting a shape model to the tomosynthesis projection data.

By adapting the surface of the FE model to the breast surface extracted from the DBT dataset, the deformable FE model may provide an estimated volumetric deformation field defining a mapping between the MR and the DBT dataset. This mapping may allow identification of anatomically corresponding positions in the MR and DBT data. Based on the mapping, a joint visualization of the MR and DBT images may be generated.

The position of calcifications detected and segmented in the DBT data may be marked by graphic labels in the MR images. Also, a side-by-side view of MR and DBT may be presented. A region of interest (ROI, 2D), or volume of interest (VOI, 3D) selected in one of the datasets may be indicated at the anatomically corresponding position in both datasets. For example, a user may indicate a point, region, or volume of interest in either one of the datasets, and the system may be arranged to automatically indicate the anatomically corresponding point, region, or volume of interest in the other dataset. This may allow, for example, visual inspection of image features in DBT at a location of significant contrast uptake in the dynamic contrast-enhanced MR series. The location of significant contrast uptake may be identified in the dynamic contrast-enhanced MR series automatically or manually. The system may then indicate the anatomically corresponding position in the DBT dataset, either automatically or semi-automatically. In this way, the ROI, or VOI may be defined by the user or computed automatically by segmentation of a lesion in either the DBT or the MR dataset.

Either one of the datasets may be deformed, or warped, in order to be aligned with the image in the other modality, such that corresponding MR and DBT intensity values are available at the voxel positions. Such aligned volumes may be presented side by side, while viewing functionality (slice selection, zoom, loupe, etc.) may be linked. The deformed dataset (e.g. the DBT volume) may also be superimposed on the MR volume, for example, as a colored transparent overlay.

The tomosynthesis reconstruction process may be improved by regularizing an iterative tomosynthesis reconstruction with a compressed 3D MR data set of the same patient. To this end, corresponding MR contrast values may be transformed into X-ray absorption coefficients beforehand. The tomosynthesis reconstruction process and the concept of regularizing a reconstruction by another dataset of the same patient are known in the art.

Although tomosynthesis and MR are most commonly used in compressed and uncompressed breast acquisition modes, respectively, other imaging modalities may be used for the first, or natural-breast, image and for the second, or compressed-breast, image. For example, breast CT may be used for 3D uncompressed image acquisition. Whole breast 3D ultrasound imaging without compression of the breast may also be performed. For 3D compressed image acquisition, whole breast 3D ultrasound imaging with compression of the breast may be performed. Other modalities may be applied as well.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a floppy disc or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for multi-modality breast imaging, comprising:
   a first shape model constructing sub-system configured to construct a first shape model of the breast as represented in a first image, in which the breast has a first deformation state, wherein the first image is a breast MR image;
   a second shape model constructing sub-system configured to construct a second shape model of the breast as represented in a second image, in which the breast is compressed such that the breast has a second deformation state different from the first deformation state;
   a deformation estimating sub-system configured to estimate a volumetric deformation field defining a mapping between the first image and the second image on the basis of the shape models and an elastic deformation model of the breast;

an image marker configured to mark an anatomical point or region of interest at corresponding positions in both the first image and the second image, based on the volumetric deformation field;

a contrast uptake detector configured to detect a location of contrast uptake due to vascularization in the breast MR image, the image marker being arranged to mark an anatomical position in the second image corresponding to the location detected in the breast MR image, based on the volumetric deformation field.

2. The system according to claim 1, wherein the deformation estimating sub-system is configured to estimate the volumetric deformation field on the basis of a first tissue surface of the breast in the first image and a second tissue surface of the breast in the second image.

3. The system according to claim 1, wherein the deformation estimating sub-system is configured to estimate the volumetric deformation field on the basis of an estimation of tissue volume of the breast as represented in the first image compared to the tissue volume of the breast as represented in the second image.

4. The system according to claim 1, wherein the deformation estimating sub-system further includes:
a landmark identifying sub-system for identifying a common landmark in the first image and in the second image.

5. The system according to claim 4, wherein the landmark identifying sub-system is configured to identify a nipple as the landmark.

6. The system according to claim 4, wherein the landmark identifying sub-system is configured to identify a lymph node as the landmark.

7. The system according to claim 4, wherein the landmark identifying sub-system is configured to identify at least part of a milk duct as the landmark.

8. The system according to claim 1, wherein the deformation estimating sub-system is configured to estimate the volumetric deformation field on the basis of compression information which is indicative of a state of compression plates during acquisition of the second image.

9. The system according to claim 1, wherein the second image includes a breast tomosynthesis image, the system further including:
a calcification detector configured to detect a calcification in the breast tomosynthesis image, the image marker being configured to mark an anatomical position in the first image corresponding to the calcification, based on the volumetric deformation field.

10. A breast image acquisition apparatus comprising:
a first scanner for acquiring the first image;
a second scanner fir acquiring the second image; and
the system according to claim 1.

11. A medical workstation comprising:
the system according to claim 1; and
a display configured to display breast information based on the volumetric deformation field.

12. A method of multi-modality breast imaging, comprising the steps of:
constructing a first shape model of the breast as represented in a first image, in which the breast has a first deformation state;
constructing a second shape model of the breast as represented in a second image, in which the breast is compressed such that the breast has a second deformation state different from the first deformation state;
estimating a volumetric deformation field defining a mapping between the first image and the second image on the basis of the shape models and an elastic deformation model of the breast;
detecting a location of contrast uptake in the first image;
applying the volumetric deformation field to the detected location of contrast uptake in the first image to determine a corresponding anatomical location in the second image; and
controlling a display to mark the corresponding an anatomical region in the second image corresponding to the location of contrast uptake in the first image.

13. A non-transitory computer readable medium comprising instructions for causing a processor system to perform the method according to claim 12.

14. A system for multi-modality breast imaging, comprising:
one or more computer processors programmed to:
receive a first image of a breast generated by a first imaging modality and in which the breast has a first deformation state;
receive a second image of said breast generated by a second imaging modality and in which the breast is compressed such that the breast has a second deformation state different from the first deformation state;
construct a first shape model of the breast as represented in the first image utilizing a geometric breast model;
construct a second shape model of the breast as represented in the second image utilizing the geometric breast model;
estimate a volumetric deformation field defining a mapping between the first image and the second image on the basis of the shape models and an elastic deformation model of the breast;
detect a location of contrast uptake in the first image;
apply the volumetric deformation field to the detected location of contrast uptake in the first image to determine a corresponding anatomical location in the second image; and
a display controlled by the one or more computer processors to mark the corresponding an anatomical region in the second image corresponding to the location of contrast uptake in the first image to display at least one of the first and second images.

15. The system according to claim 14, wherein the estimating a volumetric deformation field is based on at least one of:
a first tissue surface of the breast in the first image and a second tissue surface of the breast in the second image;
an estimation of tissue volume of the breast as represented in the first image compared to the tissue volume of the breast as represented in the second image; and
a state of compression plates which compresses the breast during acquisition of the second image.

16. The system according to claim 14, wherein the one or more computer processors are further configured to:
identify a common landmark in the first image and in the second image, the landmark being one of a nipple, a lymph node, and at least a portion of a milk duct; and
refine the estimate of the volume deformation field such that the volume deformation field transforms a location of the landmark in one of the images to a location of the landmark in the other image.

17. The system according to claim 14, further including:

a user interface configured to designate an anatomical point or region of interest at corresponding positions in one of the first image and the second image, wherein the one or more computer processor are further configured to:

map the designated anatomical point or region of interest to a corresponding point or region in the other image; and control the display to denote the corresponding point or region in the other image.

18. The method according to claim 10, wherein the step of estimating a volumetric deformation field further includes:

identifying a common nipple, a lymph node, or at least part of a milk duct as a common landmark in both the first image and the second image.

19. The system according to claim 14, further including:

a calcification detector which detects a calcification in the second image; and an image marker which marks an anatomical point in the first image corresponding to the calcification.

20. A system for multi-modality breast imaging, comprising:

one or more computer processors programmed to:

receive a first image of a breast generated by a magnetic resonance scanner in which the breast has a first deformation state;

receive a second image of said breast generated by an x-ray breast tomosynthesis scanner and in which the breast is compressed such that the breast has a second deformation state different from the first deformation state;

construct a first shape model of the breast as resented in the first image utilizing geometric breast model;

construct a second shape model of the breast as represented in the second image utilizing the geometric breast model;

estimate a volumetric deformation field defining a mapping between the first image and the second image on the basis of the shape models and an elastic deformation model of the breast; and a display controlled by the one or more computer processors to display at least one of the first and second images.

* * * * *